United States Patent
Jufer et al.

(10) Patent No.: US 10,447,095 B2
(45) Date of Patent: Oct. 15, 2019

(54) SIMPLIFIED MOTOR MODULE

(71) Applicant: ETA SA Manufacture Horlogere Suisse, Grenchen (CH)

(72) Inventors: Martin Jufer, Melchnau (CH); Yann Lavenu, Basel (CH); David Benjamin Kraehenbuehl, Bettlach (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 306 days.

(21) Appl. No.: 15/413,926

(22) Filed: Jan. 24, 2017

(65) Prior Publication Data
US 2017/0244290 A1    Aug. 24, 2017

(30) Foreign Application Priority Data
Feb. 23, 2016 (EP) .................. 16156912

(51) Int. Cl.
*H02K 37/16* (2006.01)
*H02K 1/14* (2006.01)
*H02K 11/33* (2016.01)
*H02K 37/00* (2006.01)
*G04C 3/14* (2006.01)

(52) U.S. Cl.
CPC ............. *H02K 1/14* (2013.01); *H02K 1/143* (2013.01); *H02K 11/33* (2016.01); *H02K 37/00* (2013.01); *H02K 37/16* (2013.01); *G04C 3/14* (2013.01)

(58) Field of Classification Search
CPC ........ H02K 1/143; H02K 37/00; H02K 37/16; G04C 13/11
See application file for complete search history.

(56) References Cited

U.S. PATENT DOCUMENTS

| 6,973,010 B1* | 12/2005 | Koike .................. G04C 3/008 310/49.01 |
| 2013/0162060 A1 | 6/2013 | Fukushima et al. |
| 2015/0092522 A1* | 4/2015 | Saito .................. H02K 21/185 368/80 |

FOREIGN PATENT DOCUMENTS

EP    2 615 509 A1    7/2013

OTHER PUBLICATIONS

European Search Report dated Aug. 26, 2016 in European Application 16156912.4, filed on Feb. 23, 2016 (with English Translation of Categories of cited documents).

* cited by examiner

*Primary Examiner* — Dang D Le
(74) *Attorney, Agent, or Firm* — Oblon, McClelland, Maier & Neustadt, L.L.P.

(57) ABSTRACT

A motor module includes a stator formed of a main plate of a first thickness on which is mounted a rotor The stator has at each end a receiving zone, the thickness of which is less than the first thickness.

11 Claims, 2 Drawing Sheets

SIMPLIFIED MOTOR MODULE

This application claims priority from European Patent application 16156912.4 of Feb. 23, 2016, the entire disclosure of which is hereby incorporated herein by reference.

The present invention relates to a motor module comprising a stator on which are mounted a rotor, a coil and an electronic module.

PRIOR ART

Electronic watches equipped with hands for indicating the time are currently known. These watches comprise a time base formed of a quartz in order to provide a signal used as a time reference. This signal is transmitted to a control unit provided with a microcontroller which itself controls stepper-type electric motors for moving the hands.

A motor module 1 which is conventionally used, which can be seen in FIG. 1, conventionally comprises 3 elements: a stator 2, a coil composed of a coil core 3 with a coil wire 4 wound around it and a third element 5 which is the electronic module comprising a printed circuit on which the quartz and the microcontroller are assembled.

In the embodiment shown in FIG. 1, the stator 2 is narrowed in its central part in order to form a receiving zone at each end. These receiving zones enable the stator 2 to be fixed to the coil core 3 around which a coil wire 4 is wound. The coil core is then arranged so that the coil wire wound on the core is accommodated in the narrowed zone of the stator. The third element, the electronic module 5, is then fixed to the coil core.

The drawback of this configuration is that it gives rise to bulkiness of the motor module. This is because this configuration involves having the three elements which are stacked one on another such that their thicknesses add up.

Consequently, the dimensions of the case of the watch have to make allowance for this thickness.

SUMMARY OF THE INVENTION

The object of the present invention is to overcome the drawbacks of the prior art by proposing a motor module which is simpler and less bulky.

To this end, the invention relates to a motor module comprising a stator formed of a main plate of a first thickness on which is mounted a rotor, said stator being configured in order to have at each end a receiving zone, the thickness of which is less than the first thickness, characterised in that a coil core formed of a bar of a second thickness on which is wound a coil wire forming the coil of the motor is fixed to these receiving zones, the motor furthermore comprising a printed circuit having a third thickness which is fixed to the stator.

In a first advantageous embodiment, the motor module is arranged such that the thickness of the assembled motor module is less than the total of the thicknesses of the stator, the coil core and the printed circuit combined.

In a second advantageous embodiment, the motor module is arranged such that the thickness of the assembled motor module is equal to the thickness of the stator plus the thickness of the printed circuit or the thickness of the receiving zones plus the thickness of the coil core and the thickness of the wound coil wire.

In a third advantageous embodiment, the motor module is arranged such that the thickness of the stator plus the thickness of the printed circuit is equal to the thickness of the receiving zones plus the thickness of the coil core and the thickness of the wound coil wire.

In a fourth advantageous embodiment, the main plate of the stator is narrowed in its central part in order to form a receiving zone at each end.

In a fifth advantageous embodiment, the main plate of the stator is configured to have a central part and to have a receiving zone at each end, these receiving zones extending substantially perpendicularly relative to the longitudinal axis of the main plate to form a receptacle in which the coil core is accommodated.

In another advantageous embodiment, the printed circuit comprises conductive tracks which connect connection regions to which the coil wire of the motor module is connected.

In another advantageous embodiment, the printed circuit bears the controller unit of the motor.

The invention furthermore relates to a watch movement comprising a base plate bearing a battery for powering a time base and a control unit, said control unit being mounted on an electronic module which controls a motor module which cooperates with gear trains driving display means, characterised in that the motor module is the motor module according to any of the preceding claims.

BRIEF DESCRIPTION OF THE DRAWINGS

The objects, advantages and features of the invention will become more clearly apparent from the following detailed description of at least one embodiment of the invention, which is given solely by way of non-limitative example and is illustrated by the accompanying drawings, in which.

DETAILED DESCRIPTION

Figure 1:
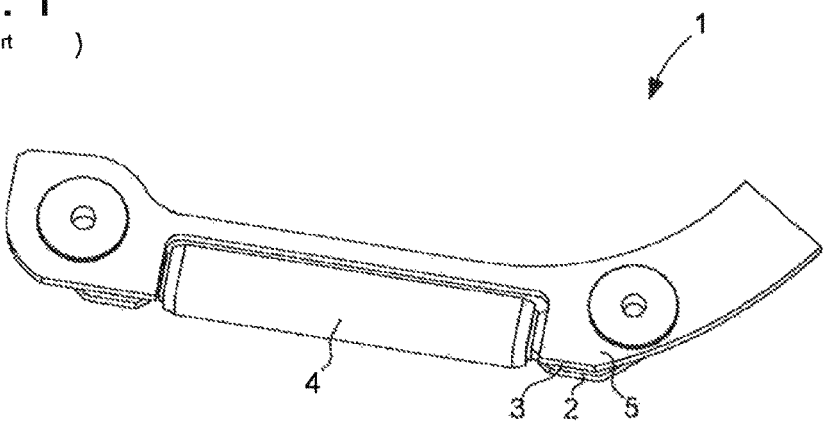
FIG. 1 schematically depicts a motor module of the prior art.
Figure 2:
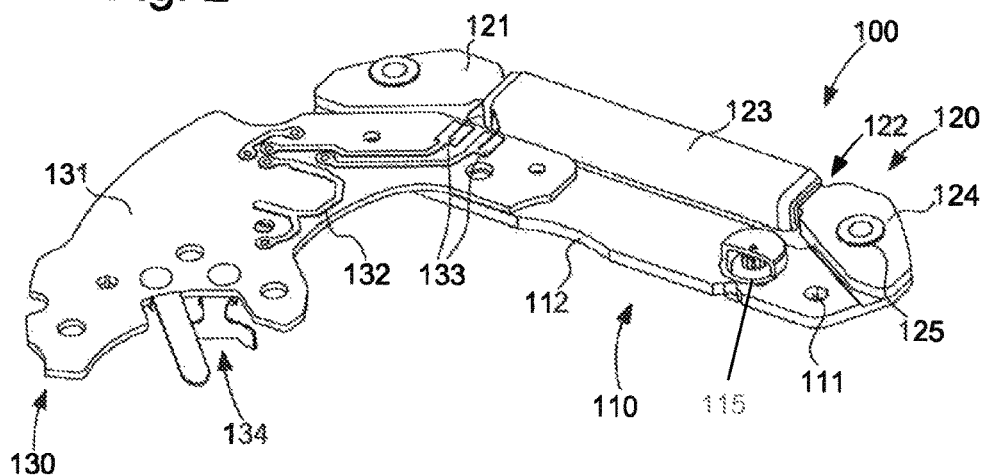
FIGS. 2 to 5 schematically depict a motor module according to the invention.

A motor module according to the invention is depicted in FIG. 2. This motor module is a module capable of being integrated in an electronic watch movement (not shown). Such an electronic watch movement comprises a base plate on which various elements are arranged. This base plate is used in order to bear a battery for powering said watch movement, but also for bearing a printed circuit on which the time base and the control unit are arranged. This base plate also serves to bear the gear trains driving the display means such as hands or discs.

The motor module is thus a module which bears the motor driving the gear trains and which is controlled by the control unit: this motor module is therefore arranged to be capable of receiving electrical signals and transforming them into mechanical movement, that is to say rotation of the motor coupled to the gear trains.

According to FIG. 2, the motor module 100 is formed of three elements. The first element 110 is the stator/rotor element, that is to say the stator and the rotor 115 of the motor. The second element 120 is the core element, that is to say that it is a plate of soft iron around which a coil wire is wound. This coil functions in conjunction with the rotor/stator assembly 110. When an electric pulse passes through the coil, a magnetic field is propagated from the core into the stator. Under the effect of this field, the rotor 115 is displaced and rotates by half a turn, repositioning itself under the effect of its magnetism. The polarity of the pulse determines the direction in which the magnetic field will pass through the stator. As the rotor 115, after its half-turn, positions itself creating magnetic conditions which are the opposite of those of the first step, a pulse of opposite sign to the previous one is required to allow it to be moved back again by half a turn (still in the same direction of rotation). This cycle is repeated ceaselessly in order to turn the motor.

The third element 130 is the printed circuit 131. This printed circuit is the part which forms an interface between the motor and the control unit. In fact, the control unit is the member which sends the pulses to the motor: it is therefore necessary to have means which permit electrical contact between the two. In the present case, a printed circuit is used. This printed circuit is used to bear at least two conductive tracks which cooperate with connection regions or connectors in order to connect the control unit to the coil.

Figure 3:
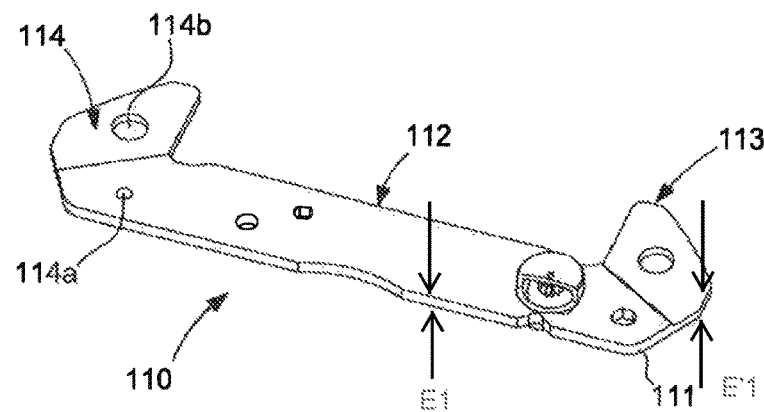
Figure 4:
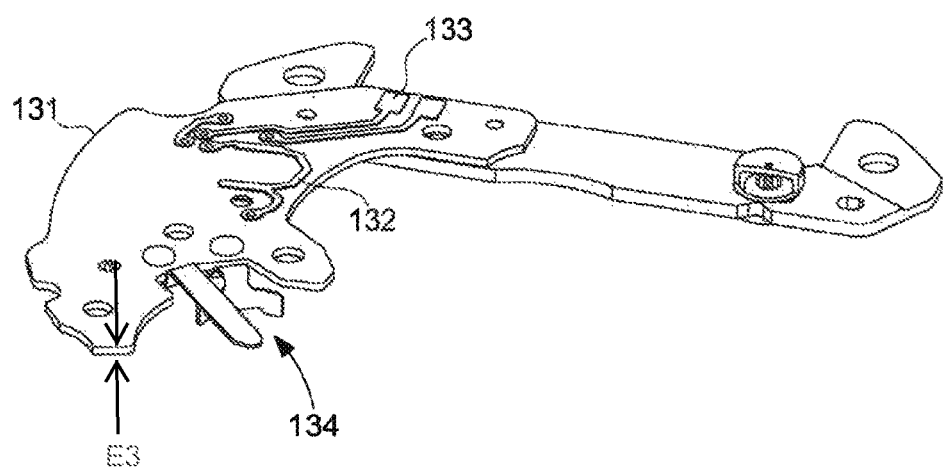
Figure 5:
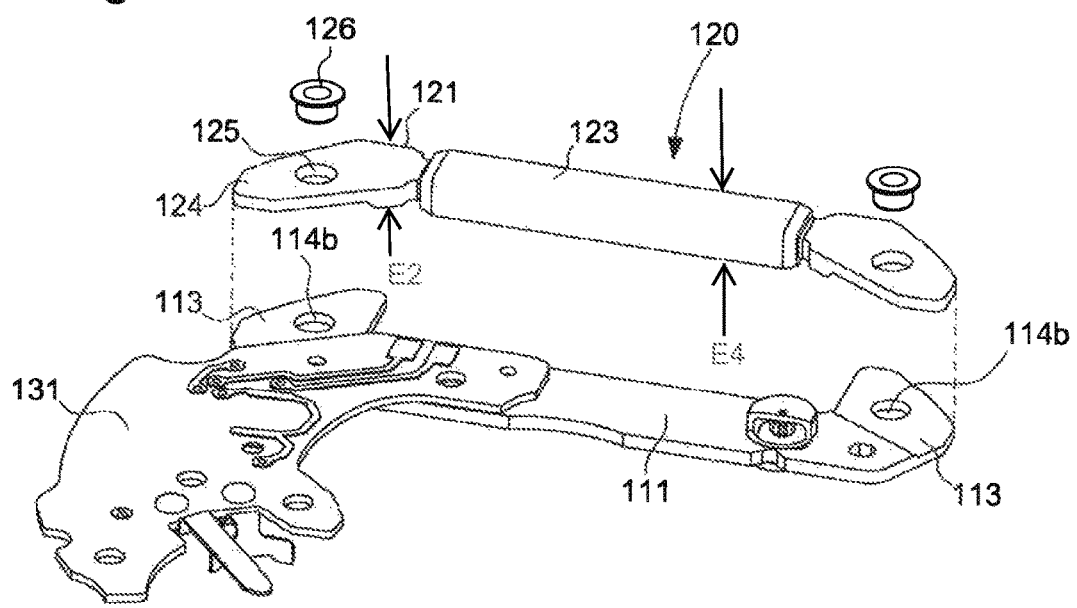

The first element 110, which can be seen in FIGS. 2 and 3, comprises a stator 111 having a first thickness E1. This stator 111 is in the form of a main plate having a central part 112 and is configured so as to form a receiving zone 113 at each end. These receiving zones 113 extend substantially perpendicularly relative to the longitudinal axis of the main plate forming the stator, and are used for assembling the first element 110 with the second element 120. In fact, the second element 120 is formed of a coil core 121 having a second thickness E2. This coil core 121 is in the form of a bar around which the coil wire 123 will be wound, which adds an additional thickness E4. Furthermore, at each end of this bar, a fixing zone 124 is arranged. These fixing zones 124 are advantageously configured in order to cooperate perfectly with the receiving zones 113 of the first element 110. These receiving zones 113 also have a lesser thickness than that of the bar. Likewise, provision may be made for the shape of the stator 111 of the first element 110 with the receiving zones 113 extending perpendicularly to the central part to result in the appearance of a receptacle for accommodating therein the wound coil wire 123 of the second element 120.

Advantageously according to the invention, the receiving zones 113 of the first element 110 have a thickness E'1 which is less than the thickness E1 of the central part. This feature then makes it possible to reduce the thickness of the assembly formed by the first element 110 and the second element 120.

For fixing, the receiving zones 113 and the fixing zones 124 may each be provided with a through hole so that studs or rivets can be used.

The third element 130 is therefore a printed circuit 131 which forms the interface between the motor and the control unit. This printed circuit 131 is in the form of an epoxy plate having a third thickness E3 on which conductive tracks 132 are arranged. The purpose of this printed circuit 131 is therefore to be integrated in the motor module according to the invention. In the embodiment of FIG. 2, the printed circuit 131 comprises two connection regions 133 which permit connection, via wires, to the coil 121, and conductive tracks which allow them to be connected to the controller unit, it being possible to arrange contact strips 134 in order to form the electrical connection between the printed circuit 131 and the battery. The microcontroller of the controller unit can be arranged on the printed circuit 131 or on a different printed circuit.

Ingeniously according to the invention, this configuration makes it possible to have the three elements 110, 120, 130 assembled together such that the thickness E5 of the assembled motor module 100 is less than the total of the thicknesses E1, E2 and E3 of the three elements 110, 120, 130 combined. More particularly, the thicknesses of the different elements 110, 120, 130 can be calculated such that the thickness E1 of the stator 111 plus that E3 of the printed circuit 131 does not exceed the thickness E1 of the receiving zones plus that E2 of the coil core 121 and the thickness E4 of the wound coil wire. This makes it possible advantageously to have a motor module 100 with a thickness which is significantly reduced compared with a known motor module wherein its thickness is the total of the thicknesses of the elements forming it, the present invention proposing a particular arrangement which permits optimisation of space.

To mount this motor module 100, the first stage consists of taking the stator 111 as can be seen in FIG. 3. This stator 111 is machined so as to have holes 114 which serve for fixing. The stator then comprises holes 114a for fixing the printed circuit and holes 114b for fixing the core element. The stator 111 is also pre-mounted to combine with the rotor.

In a second stage, the printed circuit 131 is taken, the latter having undergone the stages during which the conductive tracks 132, the connection regions 133 and the contact strips 134 are produced and fixed. Furthermore, the printed circuit 131 is machined to form holes for fixing, these holes being arranged on the plate so as to permit cooperation with the holes 114a for fixing the printed circuit of the stator 111. This second stage is carried out by fixing the printed circuit 131 and the stator 111. These two elements 110, 130 are then arranged one on the other and aligned so that the holes are opposite each other. The whole is then fixed with rivets or studs 126.

In a third stage, the coil element 120 comprising the coil core 121 provided with the wound coil wire 123 and fixing holes 125 is mounted. These fixing holes 125 are arranged to be used in cooperation with fixing holes 114b arranged on the receiving zones 113 at each end of the stator 111. These two elements are held together via studs or rivets 126.

It will be understood that various amendments and/or improvements and/or combinations which are obvious to persons skilled in the art may be made to the different embodiments of the invention which is set forth above, without departing from the scope of the invention defined by the accompanying claims.

What is claimed is:

1. A motor module comprising:
   a stator formed of a main plate of a first thickness on which is mounted a rotor, said stator being configured in order to have at each end a receiving zone, a thickness of the receiving zones is less than the first thickness;
   a coil core formed of a bar of a second thickness on which is wound a coil wire forming a coil of the motor module, the coil core being fixed to the receiving zones; and
   a printed circuit fixed to the stator, the printed circuit board having a third thickness,
   wherein the coil core is fixed to the receiving zones of the stator via first holes, the printed circuit is fixed to the main plate of the stator via second holes, and the first holes are spaced apart from the second holes.

2. The motor module according to claim 1, wherein the assembled motor module is less thick than a total of the the first thickness of the stator, the second thickness of the coil core, and the third thickness of the printed circuit combined.

3. The motor module according to claim 2, wherein the assembled motor module is equal in thickness to the first thickness of the stator plus the third thickness of the printed circuit or the thickness of the receiving zones plus the second thickness of the coil core and a fourth thickness of the wound coil wire.

4. The motor module according to claim 3, wherein the main plate of the stator is narrowed in its central part in order to form one of the receiving zones at each end.

5. The motor module according to claim 1, wherein the assembled motor module is equal in thickness to the first thickness of the stator plus the third thickness of the printed circuit or the thickness of the receiving zones plus the second thickness of the coil core and a fourth thickness of the wound coil wire.

6. The motor module according to claim 5, wherein the first thickness of the stator plus the third thickness of the printed circuit is equal to the thickness of the receiving zones plus the second thickness of the coil core and the fourth thickness of the wound coil wire.

7. The motor module according to claim 1, wherein the main plate of the stator is narrowed in its central part in order to form one of the receiving zones at each end.

8. The motor module according to claim 7, wherein the receiving zones extending substantially perpendicularly relative to a longitudinal axis of the main plate to form a receptacle in which the coil core is accommodated.

9. The motor module according to claim 1, wherein the printed circuit comprises conductive tracks which connect connection regions to which the coil wire of the motor module is connected.

10. The motor module according to claim 1, wherein the printed circuit bears the controller unit of the motor.

11. The motor module according to claim 1, wherein the coil core and the printed circuit are fixed to the stator such that the coil core does not overlap the printed circuit in a thickness direction of the motor module.

* * * * *